United States Patent [19]

Kurtz et al.

[11] Patent Number: 4,919,910
[45] Date of Patent: Apr. 24, 1990

[54] PROCESS FOR THE PRODUCTION OF POTASSIUM BICARBONATE

[75] Inventors: Andrew D. Kurtz, Somerville; Anthony E. Winston, East Brunswick, both of N.J.

[73] Assignee: Church & Dwight Co., Inc., Princeton, N.J.

[21] Appl. No.: 233,330

[22] Filed: Aug. 17, 1988

[51] Int. Cl.⁵ .............................................. C01D 7/10
[52] U.S. Cl. .................................................. 423/422
[58] Field of Search ................ 423/209, 421, 422, 425

[56] References Cited

U.S. PATENT DOCUMENTS

| 276,020 | 4/1883 | Gaskell et al. | 423/422 |
|---|---|---|---|
| 276,990 | 5/1883 | Carey et al. | 423/422 |
| 574,089 | 12/1896 | Hawliczek | 423/422 |
| 835,771 | 11/1906 | Behrens | 423/422 |
| 4,459,272 | 7/1984 | Krieg et al. | 423/209 |
| 4,664,893 | 5/1987 | Sarapata et al. | 423/209 |

Primary Examiner—Robert L. Stoll
Assistant Examiner—Wayne A. Langel
Attorney, Agent, or Firm—Bryan, Cave, McPheeters & McRoberts

[57] ABSTRACT

A process for the production of potassium bicarbonate, involving the dry carbonation of potassium carbonate with a carbon dioxide gas stream having temperatures of up to 115° C. and relative humidities of from 40% to 75%. High conversions of the potassium carbonate, carbon dioxide and water vapor reactants are achieved, with the formation of a substantially dry bicarbonate product which may be further processed without additional drying or handling expense.

7 Claims, 1 Drawing Sheet

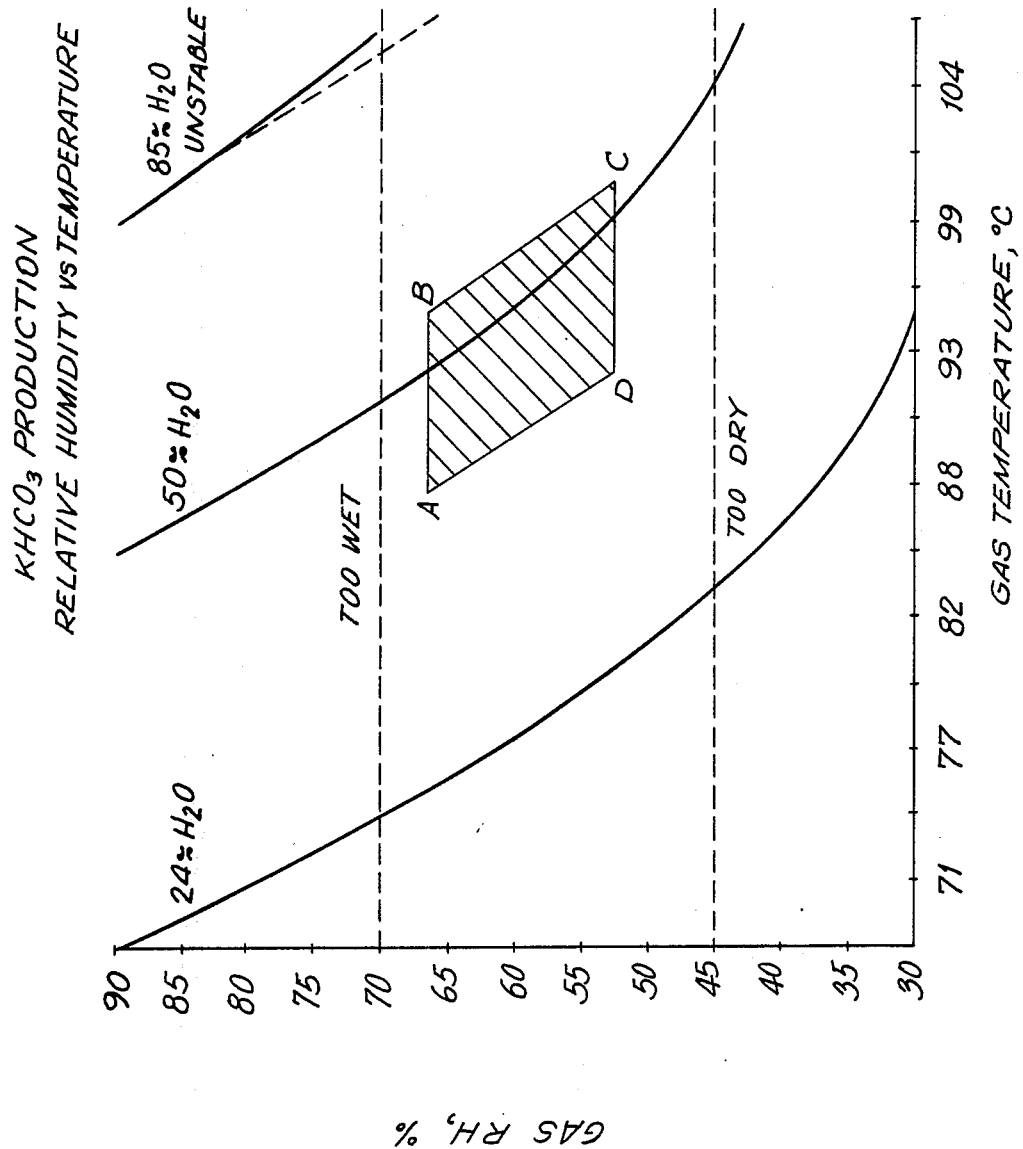

PROCESS FOR THE PRODUCTION OF POTASSIUM BICARBONATE

BACKGROUND OF THE INVENTION

This invention relates to a process for the production of potassium bicarbonate and, more particularly, to a vapor phase carbonation technique for reacting potassium carbonate with carbon dioxide and water vapor to produce the bicarbonate in substantially dry form.

It has long been known to produce potassium bicarbonate in solution from potassium chloride, potassium carbonate or other reactants. See, for example, U.S. Pat. Nos. 1,254,521; 1,400,542; 1,636,710; 2,752,222; 2,768,060; 2,782,093; 2,837,404; 2,903,337; 3,111,379; 3,141,730, 3,158,440; 3,189,409, 3,347,623; and 4,010,243.

Behrens U.S. Pat. No. 835,771, granted Nov. 13, 1906, describes a vapor phase process for the manufacture of sodium bicarbonate by treating anhydrous sodium carbonate with a gaseous mixture containing equimolar proportions of carbon dioxide and steam. To avoid condensation of the steam, Behrens described carrying out his reaction under elevated pressures and in the presence of nitrogen.

Gaseous phase, dry carbonation techniques have also been disclosed for the production of other alkali metal bicarbonates. For example, Krieg et al U.S. Pat. No. 4,459,272, lowed by the assignee of the present invention, describes a dry carbonation in which liquid water is added to the reaction medium to increase the reaction rate and control the reaction temperature. On the other hand, Sarapata et al U.S. Pat. No. 4,664,893, also owned by the assignee of the present invention, discloses that in the dry carbonation of sodium carbonate it is necessary to react a substantially saturated feed gas stream (relative humidity in excess of 90%) to maintain adequate reaction rates.

It is among the objects of the present invention to provide a dry carbonation technique for producing potassium bicarbonate from potassium carbonate in high conversions, and without the addition of liquid water or operation under substantially saturated conditions resulting in the formation of wet reaction products imposing increased drying and/or other handling costs. These and other objects and advantages of the present invention will be apparent from the following description.

SUMMARY OF THE INVENTION

In accordance with the present invention, a dry carbonation process is provided for the production of potassium bicarbonate, comprising feeding dry potassium carbonate into admixture with carbon dioxide gas at temperatures from about 70° to 110° C. and relative humidities of from about 40% to 75%, and reacting the potassium carbonate, carbon dioxide and water vapor at atmospheric pressure and under turbulent mixing conditions to produce the potassium bicarbonate. High conversions of the potassium carbonate to the desired bicarbonate are achieved, with the latter being produced in substantially dry form. The reaction is carried out under atmospheric pressure, thereby avoiding the necessity of utilizing any high-pressure equipment. Moreover, since moisture is not condensed during the carbonation, additional capital investment and/or energy expenses for materials handling or drying of the potassium bicarbonate product are unnecessary.

BRIEF DESCRIPTION OF THE DRAWING

The invention will be more fully described in connection with the preferred embodiments described below and the accompanying drawing which is a plot of the vapor phase temperature/relative humidity conditions utilized to carry out the dry carbonation hereof.

DETAILED DESCRIPTION OF THE INVENTION

The dry carbonation technique of the invention effects the following reaction:

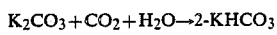

$$K_2CO_3 + CO_2 + H_2O \rightarrow 2\text{-}KHCO_3$$

The reaction is carried out in the presence of amounts of carbon dioxide and water vapor far in excess of the amounts necessary for stoichiometric reaction with the solid carbonate reactant. Further, it is feasible to operate at $CO_2:H_2O$ molar proportions varying from as little as 0.3 moles to as much as 3.0 moles $CO_2$ per mole of $H_2O$, preferably from about 0.6 to 1.5:1. It has been found that even such disparate reactant proportions may be utilized in the present process without impairing reaction rates or conversions. It is unnecessary to incorporate inert gases in the reaction medium. On the other hand, if desired, the feed gas may contain up to about 35-40% by volume nitrogen, air or other inert gas.

Control of the relative humidity of the reaction medium is critical to the successful performance of this process. Although it might appear obvious that higher relative humidity would accelerate the rate of formation of potassium bicarbonate, it is surprising that the reaction makes an unexpected jump in rate when the relative humidity is increased above about 40%. Additionally, it is surprising that if the relative humidity is maintained below about 75%, the reaction rapidly goes to completion but the resulting product is completely dry. Thus, maintenance of the humidity between about 40% and 75% allows the rapid formation of potassium bicarbonate without the need to subsequently dry the product. Above about 75% RH, the carbonation goes to completion but the product formed is difficult to handle and must be dried.

The process thus exploits the fact that $K_2CO_3$ attracts water and self-wets at relative humidities in excess of about 40%, while $KHCO_3$ spontaneously liberates water and self-dries at relative humidities less than about 75%. The presence of water on the carbonate is believed to facilitate the carbonation by providing a liquid phase on the particle surfaces, which phase evaporates from the bicarbonate product under the reaction conditions employed. Such mechanism cannot be utilized in the analogous carbonation of sodium carbonate or sodium bicarbonate monohydrate to sodium bicarbonate, since there does not appear to be any relative humidity range in which such carbonation can be carried out to completion with the concurrent formation of an essentially dry reaction product.

The relative humidity required to provide a water film on the reacting potassium carbonate particles, without leaving a water-wet potassium bicarbonate product, varies somewhat with temperature. Thus, at preferred operating temperatures of about 85°–100° C., relative humidities of about 45–70% are employed. At such temperatures, optimum results are obtained utilizing relative humidities of about 50-68%.

The carbonation is carried out at gas temperatures of from about 70° to 110° C., preferably at from about 90°-105° C. Surprisingly, even at temperatures over 95° C., the reaction product is stable and does not revert to the carbonate.

In experiments heretofore carried out, optimum results have been effected by carrying out the dry carbonation under gaseous atmospheres having temperature/RH values within the region ABCD in the accompanying drawing, most desirably at about 65% RH and 95° C. under one atmosphere total pressure. As indicated hereinabove, under such conditions it is unnecessary to add inerts to the feed gas, or to operate under higher pressures; indeed, the use of such expedients may adversely affect reaction rates at higher inert gas levels or pressures.

The carbonation is carried out under turbulent mixing conditions to insure thorough contact of the dry carbonate particles with the gaseous reactants to form the desired bicarbonate, without the condensation of liquid water. The water required for the reaction is thus entirely provided from the gas phase. Moreover, by maintaining turbulent mixing, the heat of reaction may be removed by heating exchange with the reacting gas or, if necessary, through the walls of the reactor. The desired turbulent mixing system may be provided by use of any conventional reactor providing turbulence and particle size reduction, e.g., fluidized bed reactors, blenders such as Willowtech Plow blenders or other high shear mixers, pneumatic conveyors, classifying mills, or the like.

Preferred embodiments for carrying out the process of this invention are described in the following examples. Unless otherwise indicated, all parts and percentages given in the examples (or in the preceding description) are specified by weight and all temperatures are given in degrees Celsius.

EXAMPLE 1

Batch Carbonation Under Preferred Conditions

A batch carbonation was carried ot within a conical flidized bed reactor having a perforated plate at its narrow, bottom end to distribute feed gases into a batch of ground, anhydrous, commercial-grade potassium carbonate particles (having particles sizes of from about 60 to 1200 microns) charged thereto. The reactor walls were preheated to 87° C. to prevent the condensation of moisture from the hot, humid feed gases.

One kg. of the $K_2CO_3$ was initially charged to the reactor. A feed gas mixture was formed by saturating 262.2 liters per minute of $CO_2$ with water at 82.2° C., and heating the mixture to 92.2° C. The resulting gaseous feed, consisting of a nearly equimolar mixture of $CO_2$ and $H_2O$ having a 64% RH and a temperature of 92.2° C., was fed through the reactor at a rate of 509.8 liters per minute. After 40 minutes, during which the feed gases fluidized the potassium carbonate, reacted therewith, and removed the heat of reaction, the solid reaction product was analyzed. 100% conversion to potassium bicarbonate was achieved, the bicarbonate product having a final moisture content below 0.5%.

CONTROL A AND EXAMPLES 2 AND 3

Comparison of Batch Carbonation at Lower Relative Humidities

A 500 g. charge of a finely ground commercial, anhydrous $K_2CO_3$ was charged to the fluidized bed reactor in the manner described in Example 1. In this example the potassium carbonate was ground to an average particle size of about 16 microns, in order to minimize mass transfer resistance. A feed gas mixture consisting of 155.8 liters per minute $CO_2$ (metered) and about 73.6 liters per minute $H_2O$ (calculated from vapor pressure data) was employed.

In a first run (Control A), the feed gas was saturated with water at 71° C. and then further heated to 96.1° C., to impart a 35% RH thereto. After 30 minutes feed through the reactor, analysis of the charge indicated only 30% conversion of the carbonate (attributable to some reaction at the higher RH values during initial heating of the charge), no further reaction occurring after another 20 minutes reaction under the same conditions.

In a second run (Example 2), the temperature of the carbonate reaction mass was lowered slightly to about 92.8° C., changing the relative humidity of the atmosphere to 45% RH. The conversion rose immediately to 45%. The relative humidity continued to rise to about 50%, and the reaction went to completion in 20 more minutes.

In a further run (Example 3) with the same solid and gaseous reactants, but carried out at a relative humidity of about 65% and at 93.3° C., 100% conversion of the potassium carbonate was achieved in less than 30 minutes.

EXAMPLE 4 AND CONTROL B

Comparison of Batch Carbonations at Higher Relative Humidities

In a further experiment (Example 4), the fluidized bed apparatus of Example 1 was utilized to carbonate a 500 g. charge of the finely ground anhydrous $K_2CO_3$, employing a feed gas mixture prepared by saturating 337.1 liters per minute of $CO_2$ in water at 71° C., and then heating the mixture to 96.1° C. and 52% RH. 100% conversion was achieved in 25 minutes, the final product containing only 0.5% $H_2O$.

In another run (Control B) carried out in exactly the same way, but utilizing a feed gas mixture at 76.7° C. and 78% RH, the carbonation went to completion in 25 minutes but the reaction mass became progressively wetter. The wet potassium bicarbonate product contained 9% $H_2O$.

EXAMPLE 5

Carbonation in a High Shear Batch Reactor

A small, mechanically agitated batch reactor was constructed, incorporating a 1-2,000 rpm agitator. The reactor was a plastic bottle, held vertically, with the agitator shaft entering through the top. Gases entered at the bottom, passed through a screen supporting the $K_2CO_3$ powder, and exited from a vent at the top.

A 15 g. charge of the finely milled $K_2CO_3$ was placed in the reactor, and a very slow flow of $CO_2$ and water vapor at 93.3° C. and 70% RH was passed therethrough. Total conversion was achieved in less than 5 minutes, the bicarbonate product containing no moisture.

The conditions utilized in this example approached optimal gas temperatures and relative humidities, illustrating that the carbonation reaction was not limited by the lack of reactants or product instability, but solely by mass transfer barriers. Use of the appropriate relative humidity in the vapor phase overcame the immobility and relatively poor reactivity of the dry, solid carbonate phase.

EXAMPLE 6

Batch Carbonation in a Mechanically Agitated Mixer

A Willowtech plow blender was utilized to carry out a further carbonation. The blender included a horizontal cylindrical chamber with gas inlet at the top of one end and an open vent at the top of the other end. The chamber was about 15.2 cm in diameter by 38.1 cm long and contained 6 plow blades rotating at about 200 rpm. The device was insulated and equipped with temperature-sensing instruments.

A feed batch of 1700 grams of the finely milled anhydrous potassium carbonate was placed in the blender. A mixture containing 60 liters per minute $CO_2$ and 67.4 liters per minute $H_2O$ was fed into the reactor at 94.4° C. and 65% RH. After feeding the gas mixture through the reactor for 30 minutes, 100% conversion was achieved. The potassium bicarbonate product contained 0.6% $H_2O$, felt dry and was free-flowing.

The results obtained in the preceding carbonations of anhydrous potassium carbonate are summarized in Table I below:

RH was fed therethrough. Total conversion was achieved in 10 minutes, the bicarbonate product formed containing no detectable moisture. Since water transport resistances were reduced, the use of the hydrated carbonate in the fluid bed reaction system resulted in an accelerated reaction at optimum relative humidity.

EXAMPLE 8

Batch Carbonation of Hydrated Potassium Carbonate in Plow Blender 1887 grams of the hydrated potassium carbonate reacted in Example 7 were charged to the plow blender described in Example 6 above. A feed gas stream consisting of 60.7 liters per minute $CO_2$ and 66.7 liters per minute $H_2O$ were fed through the reactor at 93.3° C. and 65% RH. Substantially the same reaction rate curve was obtained as in Example 7; after 15 minutes feed, 99% conversion of the carbonate was obtained. The bicarbonate product had no detectable moisture content.

EXAMPLES 9-11

Continuous Carbonation of Hydrated Potassium Carbonate in Plow Blender Reactor

The hydrated carbonate described in Example 7 was continuously fed through the plow blender reactor concurrently with the feed gas mixture employed in Example 8, viz., 60 liters per minute $CO_2$ in admixture with 67.4 liters per minute $H_2O$ at a temperature of 94.4° C. and 65% RH.

In a first run, a carbonate feed rate of 125 g. per minute and a solids residence time of approximately 20 minutes were maintained; 99% conversion of the car-

TABLE I

COMPARATIVE RESULTS OBTAINED IN VAPOR PHASE CARBONATIONS OF ANHYDROUS $K_2CO_3$

| Example or Control | Apparatus | RH (%) | Temperature (°C.) | Molar Ratio ($CO_2:H_2O$) | Conversion (%) | Product Moisture (%) |
|---|---|---|---|---|---|---|
| Ex. 1 | Fluidized Bed | 64 | 92.22 | 1.17:1 | 100% in 40 min. | 0.5 |
| Control A | " | 35 | 96.11 | 2.13:1 | 30% in 30 min. | None Detected |
| Ex. 2 | " | 45 | 92.77 | 2.00:1 | 100% in 20 min. | N.A. (<1) |
| Ex. 3 | " | 65 | 93.33 | 0.91:1 | 100% in 30 min. | N.A. (<1) |
| Ex. 4 | " | 52 | 96.11 | 1.23:1 | 100% in 25 min. | 0.5 |
| Control B | " | 78 | 76.67 | 2.14:1 | 100% in 25 min. | 9 |
| Ex. 5 | High-Speed Mechanically Agitated Reactor | 70 | 93.33 | 0.78:1 | 100% in 5 min. | 0 |
| Ex. 6 | Plow Blender | 65 | 94.44 | 0.89:1 | 100% in 30 min. | 0.6 |

EXAMPLE 7

Batch Carbonation of Hydrated Potassium Carbonate in Fluidized Bed Reactor

A further carbonation was carried out employing the fluidized bed and carbonation technique described in Example 1, but utilizing a hydrated form of potassium carbonate, $K_2CO_3.3/2H_2O$ (having a mean particle size of about 20 microns). Five hundred grams of the dry, finely milled, hydrated carbonate were charged to the reactor and a feed gas mixture of 304 liters per minute $CO_2$ and 149 liters per minute $H_2O$ at 82.22° C. and 65% bonate was continuously obtained.

In a second run (Example 10), the carbonate was fed at 155 g. per minute with a solids residence time of 16 minutes; the conversion fell to 95%.

In a third run (Example 11), the carbonate was fed at 225 g. per minute with an 11 minute residence time; in this instance, the conversion fell to 82%.

All of the bicarbonate products formed in Examples 9-11 were substantially dry.

The results obtained in Examples 7-11, employing hydrated potassium carbonate reactants, are set forth in Table II below:

TABLE II

RESULTS OBTAINED IN VAPOR PHASE CARBONATIONS OF HYDRATED $K_2CO_3$

| Example | Apparatus | RH (%) | Temperature (°C.) | Molar Ratio ($CO_2:H_2O$) | Conversion (%) | Product Moisture (%) |
|---|---|---|---|---|---|---|
| 7 | Fluidized Bed | 65 | 82.22 | 2.04:1 | 100% in 10 min. | None Detected |

TABLE II-continued

RESULTS OBTAINED IN VAPOR PHASE
CARBONATIONS OF HYDRATED $K_2CO_3$

| Example | Apparatus | RH (%) | Temperature (°C.) | Molar Ratio ($CO_2$:$H_2O$) | Conversion (%) | Product Moisture (%) |
|---|---|---|---|---|---|---|
| 8 | Plow Blender | 65 | 93.33 | 0.91:1 | 99% in 15 min. | None Detected |
| 9 | " | 65 | 94.44 | 0.89:1 | 99% at 125 g/min. | N.A. (<1%) |
| 10 | " | 65 | 94.44 | 0.89:1 | 95% at 155 g/min. | N.A. (<1%) |
| 11 | " | 65 | 94.44 | 0.89:1 | 82% at 225 g/min. | N.A. (<1%) |

It will be understood that the specific parameters of the preferred embodiments described hereinabove may be varied without departing from the scope of this invention. Accordingly, the preceding description should be construed as illustrative and not in a limiting sense.

I claim:

1. A process for the production of substantially dry potassium bicarbonate, which process comprises feeding dry potassium carbonate into admixture with carbon dioxide gas and water vapor at rates so that the reaction zone has temperatures of from 70° to 110° C. and relative humidities of from 40% to 75% and reacting the potassium carbonate, carbon dioxide, and water vapor at atmospheric pressure, under turbulent mixing conditions, and in the substantial absence of liquid water to produce substantially dry bicarbonate product without the need for a separate drying step.

2. The process of claim 1, wherein the carbon dioxide-water vapor reactants are admixed in proportions of from 0.3 to 3.0 moles of $CO_2$ per mole of $H_2O$, and contacted with the potassium carbonate at temperatures within the range of from 90° to 105° C., and at relative humidities of from 50% to 68%.

3. The process of claim 1, wherein the reaction is carried out at the temperature and relative humidity conditions within area ABCD in the attached drawing.

4. The process of claim 1, wherein the reaction is carried out in a fluidized bed reaction zone.

5. The process of claim 1, wherein the reaction is carried out in a mechanically agitated reaction zone.

6. The process of claim 1, in which the potassium carbonate is hydrated prior to reaction.

7. The process of claim 1, in which the potassium carbonate has particle sizes of from 10 to 1500 microns.

* * * * *